April 9, 1957 R. WESTON 2,788,088
NIPPLE FOR PRESSURE LUBRICATION
Original Filed May 31, 1949

INVENTOR.
ROY WESTON, DECEASED
BY PEARL WESTON, EXECUTRIX
BY
McMorrow, Berman + Davidson
ATTORNEYS.

2,788,088
Patented Apr. 9, 1957

2,788,088

NIPPLE FOR PRESSURE LUBRICATION

Roy Weston, deceased, late of Toppenish, Wash., by Pearl Weston, executrix, Toppenish, Wash., assignor of one-half to Philip Barkley, Hereford, Tex.

Substituted for abandoned application Serial No. 96,211, May 31, 1949. This application February 18, 1955, Serial No. 489,220

1 Claim. (Cl. 184—105)

The present invention relates to certain new and useful improvements in a nipple for pressure lubrication such as is in widespread general use in automobiles and various other types of machinery.

Lubrication nipples for such purposes require a spring urged valve to prevent back flow of the grease or other lubricant and to exclude dust and abrasives. These lubrication nipples are necessarily small, and there is considerable problem in devising an efficient valve structure which will be trouble free and economically feasible to manufacture. The principal difficulty is in providing a proper retainer so that the valve spring will not distort nor collapse to one side and become dislocated from its intended seat. It is a major problem to provide satisfactory means to hold the lower end of the spring in proper position and at the same time preclude excess pressure from stopping the flow of lubricant. There is also the problem of providing a globular head that can be attached to a pressure lubrication device or grease gun at various angles without reducing the flow of grease.

Most of the lubrication nipples in general use are of the ball valve type, with the ball protruding from the entrance end or else seating more inwardly where the bore of the nipple is larger and the ball need not be so small as when located at the entrance end. In either instance the ball rests upon a compression spring and there is no way to prevent the spring from distorting and collapsing sideways so that it fails to properly urge the ball to its seat in the intended manner. In either instance the spring is usually conical and its lower end is the same size as the bore in the nipple wherein it is held by crimping. This presents the inaptitude that excess pressure of the lubricant will sometimes completely compress the spring until no lubricant can flow between the coils thereof, which produces a condition known as spring lock or grease lock and stops the flow of lubricant. In many instances, this grease lock will cause the ball and its spring to be driven out of the nipple so that it is carried along with the flow of lubricant to great disadvantage. These same difficulties also exist in lubrication nipples where a plunger type valve is used instead of a ball.

It has been proposed to support the lower end of the compression spring by welding a small cross-bar across the open lower end of the nipple, but this is not economically feasible in high speed mass production and besides it does not prevent lateral distortion of the compression spring and also fails to effectively center the lower end thereof, no matter if the cross-bar is centrally crimped to engage inside the spring.

The present invention eliminates these well known difficulties and provides a lubrication nipple having an axial bore which is stepped to provide three coaxial channels for the flow of grease or other lubricant, and a plunger type valve stem extends full length of the nipple and entirely through the compression spring which seats upon a retainer ring having an upstanding flange which holds the lower end of the spring properly spaced from the inside of the nipple, and this retainer ring has channels for the flow of lubricant outside the spring as well as a central channel in which the valve stem reciprocates with sufficient clearance to provide an outlet for any lubricant which flows between the coils of the compression spring. This improved structure effectively prevents spring lock or grease lock and also assures that the compression spring cannot laterally distort and collapse. The valve stem carries two valve faces which seat simultaneously and thereby equalize the wear so as to assure proper seating and long life. The invention includes a globular head having a flat face at the entrance channel so as to assure a flow of lubricant when the nozzle of the lubrication device or grease gun is applied thereto at an angle.

The accompanying drawing shows the invention in the form in which it has been reduced to practice and fully tested.

Figure 1 is an enlarged vertical section through the invention.

Figure 2 separately shows the valve stem with its two beveled valve faces.

Figure 1:
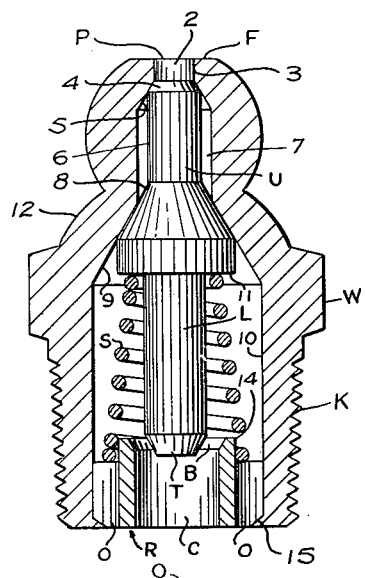
Figure 2:
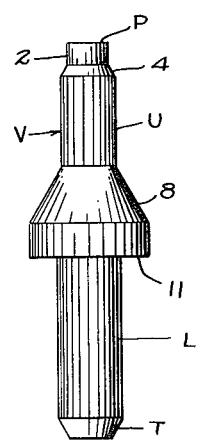

As shown in the drawing, the invention embodies an outer shell or body portion including an externally threaded shank K with a wrench engaging portion W above which there is a shoulder portion 12 and a globular head H which has a flat face F. This body portion has an axial bore which is stepped to provide three coaxial channels for the passage of grease or other lubricant. The entrance channel 3 is in the center of the flat face F of the globular head H and opens into a larger flow channel 7, the step therebetween being beveled to serve as a valve seat 5. This flow channel 7 opens into a larger channel 10 and the step therebetween is beveled to serve as a valve seat 9. This channel 10 extends full length of the threaded shank portion K, and it will be seen that the three stepped bores and the two beveled valve seats can readily be made by a single tool.

Axially disposed within the aforesaid channels is a spring urged valve stem V carrying two beveled valve faces 4 and 8 which seat in unison against the aforesaid valve seats 5 and 9 respectively. This valve stem has a tip 2 which fits closely in the entrance channel 3 of the globular head H and is flush with the flat face F thereof, this tip 2 having a flat end face as indicated at P.

The upper shank U of this valve stem is disposed within the flow channel 7 and has sufficient clearance to afford adequate flow of grease or other lubricant; and the lower shank L extends downwardly into an annular retainer ring R which supports the lower end of the compression spring S at a spaced distance from the walls of the channel 10. The upper end of this spring S seats against the shoulder 11 which is the under side of a collar resulting from the beveled valve face 8.

This retainer ring R is of paramount importance and very vital to the present invention, because it serves a fivefold purpose. This retainer ring has a central channel C and four outer channels such as O. The walls of this central channel form an upstanding flange 14 which serves as a centering device for the compression spring S which fits around this flange 14 and seats on the retainer ring itself, so that the lower end of the spring is held in fixed relation at a spaced distance from the walls of the channel 10. This central channel C has the walls thereof internally beveled as indicated at B to serve as a guide for the tapered pilot tip T of the valve stem and thereby assure alignment at the time of assembly, which is necessarily a machine operation. This central channel C is sufficiently larger than the lower shank L of the valve stem to provide liberal clearance for the flow of lubricant in the central channel as indicated by the arrows therein.

Figure 3:
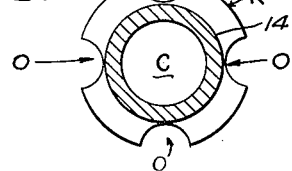
Figure 3 is a plan view of the retainer ring, partly in section taken on the line 3—3 of Figure 5.
Figure 5:
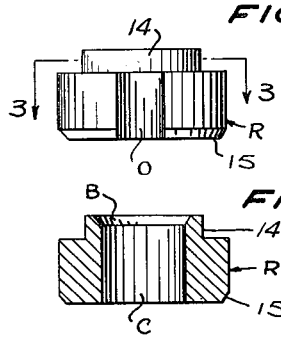
Figure 5 shows an elevation of the retainer ring.
Figure 6:
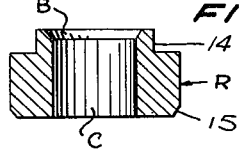
Figure 6 shows a vertical section of the retainer ring taken on the full diameter indicated by the line 6—6 of Figure 4.
Figure 4:
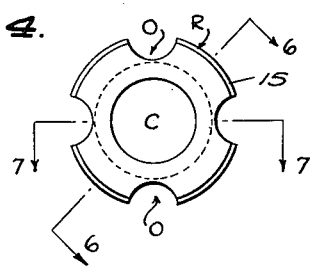
Figure 4 shows the underneath side of the retainer ring.
Figure 7:
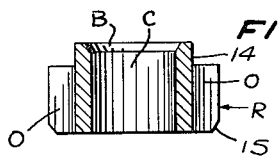
Figure 7 shows a vertical section of the retainer ring taken on the line 7—7 of Figure 4 and discloses the grease channels outside the central channel and its upstanding flange.

As best seen in Figure 3, the retainer ring R has four outer channels such as O and by reference to Figures 1, 5 and 7 it will be seen that these outer channels run from top to bottom of the retainer ring R and are just outside the central channel C. In Figure 1 arrows are shown in these outer channels O to indicate the flow of grease therethrough, which precludes building up pressure, as is a common fault in various well known lubrication nipples of the prior art.

The lower edge of the retainer ring R is externally beveled as indicated at 15 to accommodate crimping the body portion to hold the retainer ring in place as indicated in Figure 1.

It will be seen that this retainer ring R fulfills the fivefold purpose of providing a centering device for the lower end of the spring, a pilot guide for the valve stem, a central grease channel inside the spring, a plurality of grease channels outside the spring, and precludes pressure accumulation during use, thereby eliminating all possibility of grease lock and the disadvantages inherent thereto.

As shown in Figure 1 the lower end L of the valve stem extends all the way through the spring S and precludes all possibiblity of the spring escaping from its proper position, as sometimes occurs with lubrication nipples of the prior art wherein the valve stem has only a short stub for engaging the upper end of the spring. In the present invention, the valve stem is confined within the central channel C of the retainer ring, and it is therefore impossible for the spring S to collapse sideways as sometimes occurs with lubrication nipples of the prior art wherein the lower end of the valve stem does not have the guidance afforded by the present invention. The tapered tip T serves as a pilot to assure entrance of the valve stem into the spring at the time of assembly.

The valve stem is necessarily small, and the beveled valve faces 4 and 8 are necessarily limited in surface area. It is highly desirable to completely close the flow channel 7 by the valve face 4 contacting the seat 5 so that abrasive dust cannot work into this flow channel 7. This beveled valve face 4 being quite small, it would wear excessively, were it not for the larger contacting area of the beveled valve face 8 which contacts the valve seat 9 at the same time as the beveled valve face 4 contacts its seat 5, thus precluding excessive wear on the smaller valve face 4 and assuring uniform wear on both valves.

As shown in Figure 1 the seat contacting area of the beveled valve face 8 is entirely within the shoulder portion 12 of the body of the nipple, thereby providing more adequate room therebelow for a proper size spring and the retainer ring R, and also shortening the required length of the upper shank U of the valve stem, thus lessening the possibility of bending this smaller upper end of the valve stem during manufacture, assembly or use. This improved location of the valve in the shoulder portion also shortens the length of the flow channel 7 and thereby shortens the length of tool required to make this bore, whereby distorting and drifting of the tool is minimized.

The tip 2 of the valve stem having a flat end face P flush with the flat face F of the globular head H, these flat faces are always free of the nozzle of the pressure lubrication device or grease gun when connected to the globular head H. This structure is of real consequence and importance as it enables the grease gun to be considerably angled, without covering any portion of the entrance channel 3, as would otherwise occur in the absence of this flat face F on the globular head. These flat faces P and F are on the same common plane and can readily be wiped clean without unseating the valves as so often occurs with nipples closed by a ball protruding from the globular head.

The operation of the invention will be readily understood from the foregoing description, but it should be pointed out that the lubricant under pressure, pushes the valve stem down until the tip 2 is entirely free of the entrance channel 3, and the lubricant then flows partly through the four outer channels O and partly between the coils of the spring S and out through the central channel C. If the initial impact of pressure is so extreme that it urges the spring to full compression, there will still be a flow of lubricant through the four outer channels O, thus precluding any possibility of building up presure and holding the spring completely compressed so that grease cannot flow between the coils thereof, which constitutes the highly objectionable condition known as spring lock or grease lock which defeats proper lubrication and is a well known fault in every nipple where there is no flow of lubricant outside the spring. In the present invention, the flow of lubricant through the four outer channels effectively relieves the spring of excess compression to which it would otherwise be subjected if the entire flow was between the coils of the spring.

The invention has been laboratory tested by subjecting it to thousands of grease pressure impacts of 8000 pounds, and a proper flow of grease occurred in every instance, without a single instance of spring lock or grease lock, and without a single instance of driving the spring out, as repeatedly occurred in well known ball type lubrication nipples subjected to the same pressure impacts, and wherein spring lock or grease lock repeatedly occurred and stopped the flow of grease, and wherein it repeatedly occurred that the spring collapsed to one side and was rendered defective, a condition which did not occur in a single instance with the present invention.

It should be pointed out that due to the prevalence of spring lock and grease lock, it has become widespread practice to use grease pressure far in excess of actual requirements, irrespective of the fact that the excess pressure accomplishes no purpose and actually increases the prevalence of spring lock and grease lock and also increases the possibility of driving the spring out of the nipple and into the flow of lubricant. The present invention can readily withstand this excess pressure and will provide a flow of lubricant at all pressures and will also operate successfully at lower pressures which produce spring lock and grease lock in valve structures which do not provide a flow of lubricant outside the spring. Thus the present invention eliminates the need for the excessive pressure now in widespread use.

The invention is here disclosed with a threaded shank K but it will be understood that any other type of shank may be employed, it being well known common practice to use a driven fit or else a self clamping type of pressure fit, either of which eliminates the need for a wrench portion such as W. The retainer ring R may be held in place in any suitable manner instead of the crimping shown at 15 which is preferable. The outer channels O may be of any suitable shape and there may be any suitable number of them, the four here illustrated being shown as an example and not in a limiting sense. These outer channels O can conveniently be made as flutes full length of the rod or tubing stock from which the retainer ring R is made, and of course they may be of whatever shape, size, or number that is best suited to that mode of manufacture.

From the foregoing description it will be seen that the invention provides a very simplified construction, which is highly efficient, and economical to manufacture in high speed mass production.

This application is a substitute of application for Nipple for Pressure Lubrication, Serial No. 96,211, filed May 31, 1949, now abandoned.

What is claimed is:

A lubrication nipple comprising a body portion having a globular head with a flat top, said body portion having an axial bore stepped to provide three coaxial channels consisting of an entrance channel centered in said flat top and opening into a larger flow channel with the step therebetween beveled to serve as a valve seat, said flow channel opening into a larger outlet channel, the step between the last two channels being beveled to serve as a valve seat, a valve stem coaxially disposed within said channels and having two valve faces simultaneously seating against the aforesaid valve seats respectively, said valve stem having an upper shank of less diameter than said flow channel and of less length than the diameter of said globular head, and terminating in a short tip closing said entrance channel, a compression spring urging said stem towards said valve seats, a retainer ring secured in the lower end of said outlet channel and having a central channel with walls forming an upstanding flange for holding the lower end of said spring centered at a spaced distance from the inside of said body portion, said valve stem having a lower shank extending entirely through said compression spring and into the central channel of said retainer ring with sufficient clearance to provide an outlet for lubricant flowing between the coils of said spring, said retainer ring having a plurality of channels outside said central channel so as to provide outlets for lubricant flowing outside of said spring.

References Cited in the file of this patent

UNITED STATES PATENTS

| | | |
|---|---|---|
| 1,575,755 | Gresser | Mar. 9, 1926 |
| 1,694,626 | Roberts | Dec. 11, 1928 |
| 2,016,809 | Bystricky | Oct. 8, 1935 |
| 2,259,977 | Kelly | Oct. 21, 1941 |
| 2,431,769 | Parker | Dec. 2, 1947 |

FOREIGN PATENTS

| | | |
|---|---|---|
| 418,730 | Great Britain | Oct. 30, 1934 |